(12) United States Patent
Murrer

(10) Patent No.: US 8,522,724 B2
(45) Date of Patent: Sep. 3, 2013

(54) COLLAPSIBLE PET FURNITURE

(76) Inventor: Andrew Murrer, Alamo, CA (US)

( * ) Notice: Subject to any disclaimer, the term of this patent is extended or adjusted under 35 U.S.C. 154(b) by 1524 days.

(21) Appl. No.: 11/709,440

(22) Filed: Feb. 21, 2007

(65) Prior Publication Data

US 2008/0196675 A1 Aug. 21, 2008

(51) Int. Cl.
*A01K 15/02* (2006.01)

(52) U.S. Cl.
USPC .......................................................... 119/706

(58) Field of Classification Search
USPC ................. 119/702, 706, 707, 431, 461, 474,
119/491, 498, 482, 28.5; 52/79.5, 244, 245,
52/247; 446/85, 108, 476, 478; 220/4.27,
220/4.28, 4.33, 4.03
See application file for complete search history.

(56) References Cited

U.S. PATENT DOCUMENTS

| | | | | |
|---|---|---|---|---|
| 5,148,768 | A * | 9/1992 | Hinton | 119/500 |
| 6,808,074 | B1 * | 10/2004 | Schwartz | 206/577 |
| 2006/0243215 | A1 * | 11/2006 | Ho | 119/455 |

OTHER PUBLICATIONS

Omega Paw, Cozy Kingdom, http://omegapaw.com/CozyKingdom, as seen on Feb. 17, 2006 by www.archive.org via <http://web.archive.org/web/20060217044632/http://omegapaw.com/CozyKingdom.html>.*

* cited by examiner

*Primary Examiner* — Timothy D Collins
*Assistant Examiner* — Joshua Huson
(74) *Attorney, Agent, or Firm* — Bay Area Technology Law Group

(57) ABSTRACT

Pet furniture and a kit of parts for assembling pet furniture. The pet furniture includes a lower cap sized to define the base of the pet furniture, a plurality of side clips for removable insertion within said lower cap, the side clips substantially defining the height of the pet furniture. A plurality of structural side walls are provided for removable engagement with the lower cap and side clips, at least one of the structural side walls having an opening sized to enable a pet to enter and exit the pet furniture once assembled. An upper cap is provided for removable engagement with the side clips and structural side walls and lower support discs and upper support discs complete the pet furniture which are each supported by and removable from the lower cap and upper cap, respectively.

23 Claims, 3 Drawing Sheets

COLLAPSIBLE PET FURNITURE

TECHNICAL FIELD

The present invention involves pet furniture and, more specifically, pet furniture which is collapsible comprised of a sum of individual parts as well as a kit of such parts for constructing the subject pet furniture. By employing this invention, the bulk volume necessary to ship such pet furniture is greatly reduced thus improving the economics of selling such products.

BACKGROUND OF THE INVENTION

The pet furniture market is a crowded one including pet housing or "condos" designed for a wide variety of pets, but most commonly, domestic cats and dogs. Cats in particular seem to need such furniture as a cat has a natural desire to find or create a place secluded from its surroundings providing a sense of security. Such territory is often considered out of bounds to intruders where the cat can find a safe haven secluded from human or other animal intrusion.

Pet furniture has become more sophisticated as time has gone on. This is principally as a result of pet owners becoming more sensitive to a pet's needs and in expressing a willingness to satisfy those needs. For example, pet housing can also include a surface devoted to cat scratching or for supporting appended toys which a pet, particularly a pet cat, would use to self entertain. Not surprisingly, however, the pet furniture market has become increasingly competitive where manufacturing and shipping costs often times determine whether such a product will be embraced in the marketplace.

It has become increasingly apparent that as time goes on, manufacturing has shifted to remote locations where labor costs are less than those in this country. This is particularly true as it pertains to the manufacture of non-technical or relatively low end products which rely upon various unskilled labor-intensive operations. However, as manufacturing has shifted to offshore locations, shipping costs have become an increasingly more significant factor in establishing product pricing.

Typically, manufactured goods produced in Asia are imported into the United States in containerized vessels. These goods are not only manufactured but packaged at Asian factories and multiple units are placed within cardboard containers or otherwise bundled in groups for placement within cargo containers which are, in turn, stacked atop appropriately configured ocean going vessels. The shipping costs per item are dictated by the number of such items which can be placed within such shipping containers as the cost per oceanic passage substantially remains fixed.

Applied to pet furniture, in that the bulk of the volume which such an item occupies is its internal free space defined by the walls of the furniture, it is believed that shipping costs and thus the ultimate product price will be substantially less if shipping volumes could be reduced. To this end, applicant has now proposed pet furniture in the form of a kit of parts which can be shipped in a reduced volume and which is simple enough for assembly by an unskilled consumer at time of purchase.

It is thus an object of the present invention to provide pet furniture which can be produced in a remote location, shipped at a reduced cost and sold as a kit of parts for ultimate assembly by an unskilled consumer.

This and further objects will be more readily apparent when considering the following disclosure and appended claims.

SUMMARY OF THE INVENTION

The present invention involves pet furniture as well as a kit of parts for producing such furniture. The furniture comprises a lower cap sized to define the base of the pet furniture, side clips removably insertable within said lower cap sized to substantially define the height of the said pet furniture and structured side walls for removable engagement with said lower cap and side clips. At least one of the structured side walls is characterized as having an opening sized to enable a pet to enter and exit the pet furniture once assembled. An upper cap is provided for removably engaging said side clips and structured side walls. A lower support disc is configured to be supported by and removable from the lower cap while an upper support disc is sized to be supported by and removable from the upper cap.

DETAILED DESCRIPTION OF THE INVENTION

Figure 1:
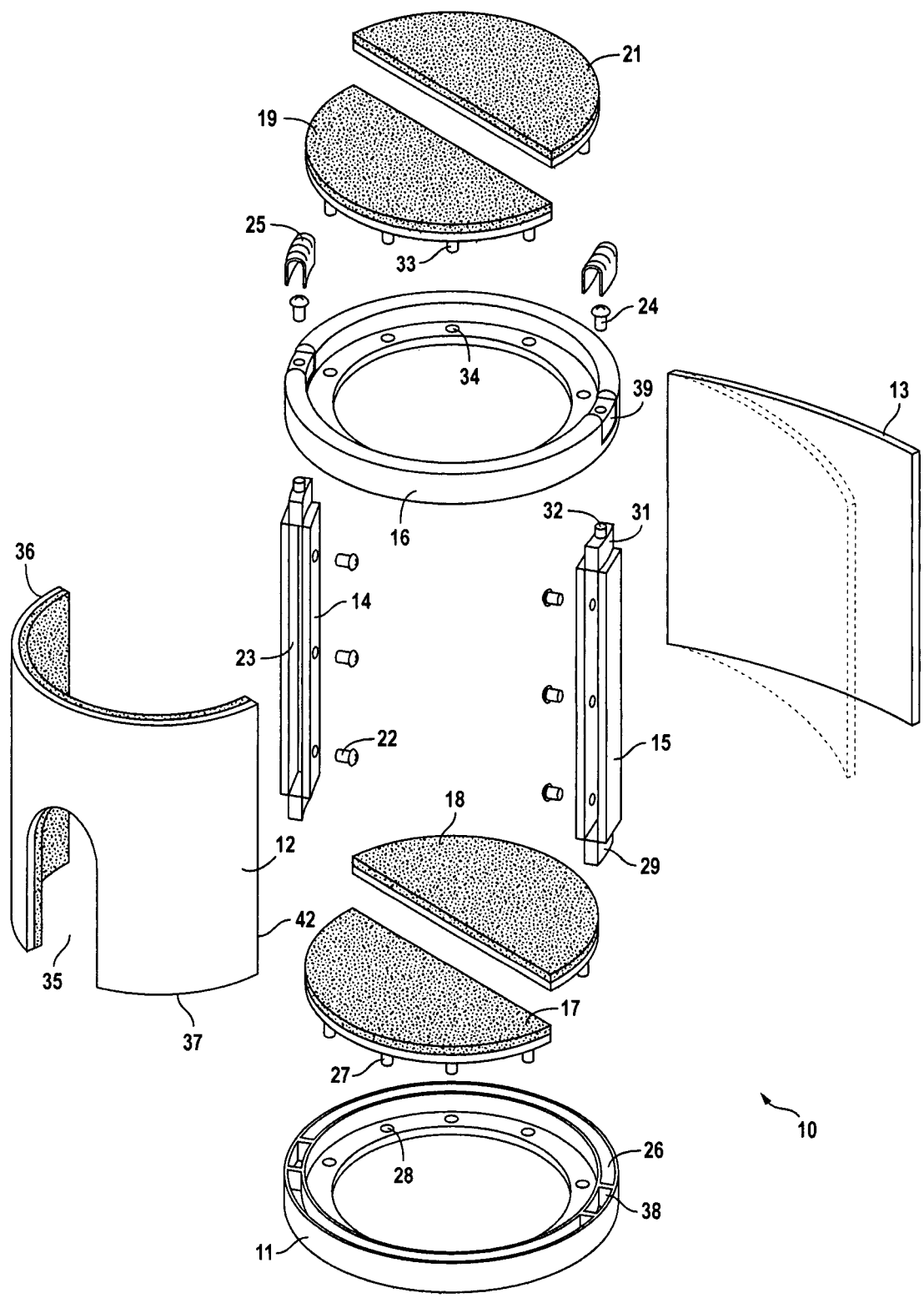
FIG. 1 is an exploded perspective view showing the component parts of the pet furniture of the present invention.

Turning first to FIG. 1, pet furniture 10 is shown as an expanded sum of parts collectively constituting a kit of parts for the construction of said pet furniture 10.

Pet furniture 10 comprises lower cap 11 sized to define the base of pet furniture 10, a plurality of said clips 14 and 15 for removable insertion within lower cap 11 and substantially defining the height of pet furniture 10. A plurality of structural side walls 12 and 13 for removable engagement within said lower cap 11 and said side clips 14 and 15 are provided, at least one of said structural side walls 12 having an opening 35 sized to enable a pet to enter and exit pet furniture 10 once assembled. Upper cap 16 is included for removably engaging side clips 14 and 15 and structural side walls 12 and 13. Lower support discs 17 and 18 are sized to be supported by and removable from lower cap 11 and upper support discs 19 and 21 are sized to be supported by and removable from upper cap 16.

It is important in evaluating the utility of the present invention to appreciate the simplicity of its assembly; again, said assembly being contemplated by an unskilled consumer. Specifically, lower cap 11 is provided with circumferential channel 26 sized to receive lower edge 37 of structural side wall 12 (as well as the lower edge of structural side wall 13). As noted from FIG. 1, structural side wall 13 could be shipped as a planar membrane bendable on side for insertion within circumferential channel 26. Side clips 14 and 15 are provided with reduced cross sectional ends 29 and 31 for receipt by open areas 38 of lower cap 11 and a corresponding open areas in upper cap 16 (not shown). Once reduced cross sectional ends 29 and 31 are inserted within lower and upper caps 11 and 16, respectively, screw 24 can be inserted there through for receipt by screw receiving member 32. This establishes the outer structural dimension of pet bed 10.

Lower support discs 17-18 and upper support discs 19-21 are further received by upper and lower support discs 11 and 16, respectively, by mating male protrusions 27 into female receiving slots 28 as shown. In doing so, the support discs can be readily removed for cleaning or for exchanging with other support discs in order to maintain the viability of pet furniture 10 and increase its attractiveness to a domestic pet. The surface of support discs can be made of a plush material such as carpet or sisal or could actually include other materials conducive for cat scratching such as corrugated cardboard with or without embedded catnip attractant.

In completing pet furniture 10, edge 42 of structural side wall 12 as well as the other edge of this structural side wall and the corresponding edges of structural side wall 13 are sized to be received by channels 23 of side clips 14 and 15 whereupon screws 22 can be inserted within the side clips for passing through and retaining the structural side walls therein. Fascia clips 25 can be inserted above upper cap 16 to complete the structural and aesthetic appearance of pet furniture 10.

Figure 2:
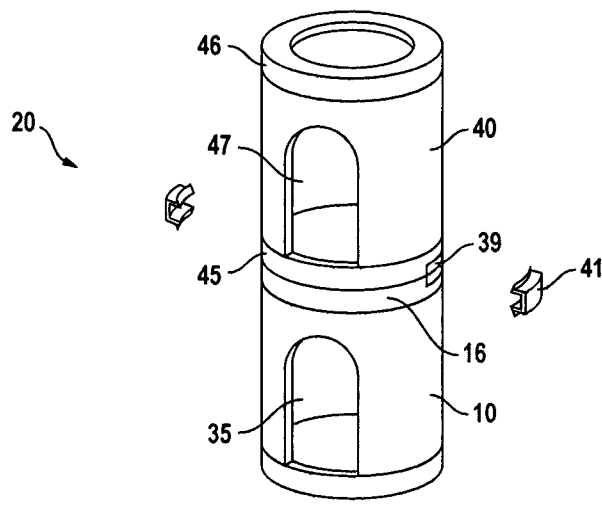
FIG. 2 is a perspective view showing a second embodiment of the present invention whereby the pet furniture of FIG. 1 is shown to be stackable in order to expand to versatility.

In order to expand upon this invention, reference is made to FIG. 2 wherein pet furniture 20 is shown. In this instance, a second upper cap 45 is sized and configured to releaseably join upper cap 16 of FIG. 1. Second upper cap 45 and upper cap 16 can remain releaseably joined through the use of clips 41 bridging openings 39 within these two members.

Upper furniture element 40 of FIG. 2 is constructed as defined with reference to the assembly of FIG. 1. In other words, upper furniture component 40 includes side clips for removable insertion within second upper cap 45 while a second set of structural side walls are included for removable engagement with said second upper cap 45 and said side clips while a third upper cap 46 completes the furniture element as shown.

The embodiment of FIG. 2 can be assembled whereby both lower portion 10 and upper portion 40 include openings 35 and 47, respectively, sized to enable a pet to enter and exit the interior of pet furniture 20. To add in the flexibility of the present invention, upon assembly, upper support discs 19 and 21 can remain in place such that subparts 10 and 40 remain individual housing units for one or more pets. Alternatively, upper support discs 19 and 21 can be removed providing for an undivided interior space between lower furniture segments 10 and 40. In such an instance, opening 47 need not be provided therein.

Figure 3:
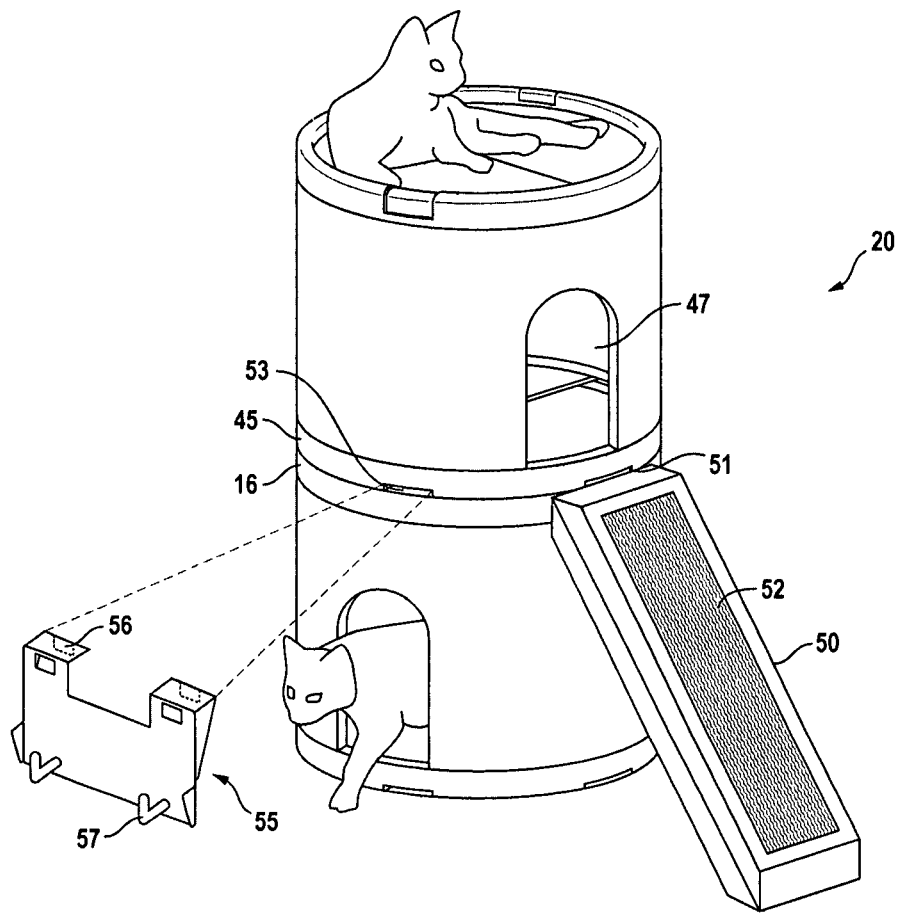
FIG. 3 is a perspective view of the invention as shown in FIG. 2 illustrating the use of a companion attractant, in this case, a cat scratching surface.

Turning next to FIG. 3, it is noted that the pet furniture of the present invention can be made even more appealing to a pet, such as a pet cat by providing the ability to releaseably attach activity toys thereto. More specifically, pet furniture 20 is shown having an interface 53 between upper cap 16 and second upper cap 45 for receipt of element 51 of cat scratching pod 50. Cat scratching pod 50 is provided with cat scratching surface 52 which can be employed by a pet cat to not only act as a ramp for gaining entry to opening 47 but to act as an inclined cat scratching surface which is found to be extremely appealing to domestic cats. Cat scratching pad 50, as well as other pet toys and attractants can be removable appended to pet furniture 20 by employing adaptor clip 55. Specifically, adaptor clip 55 is hung on pet furniture 20 at interface 53 employing hooks 56. Cat scratching pad 50 is then supported from hangars 57.

Figure 4:
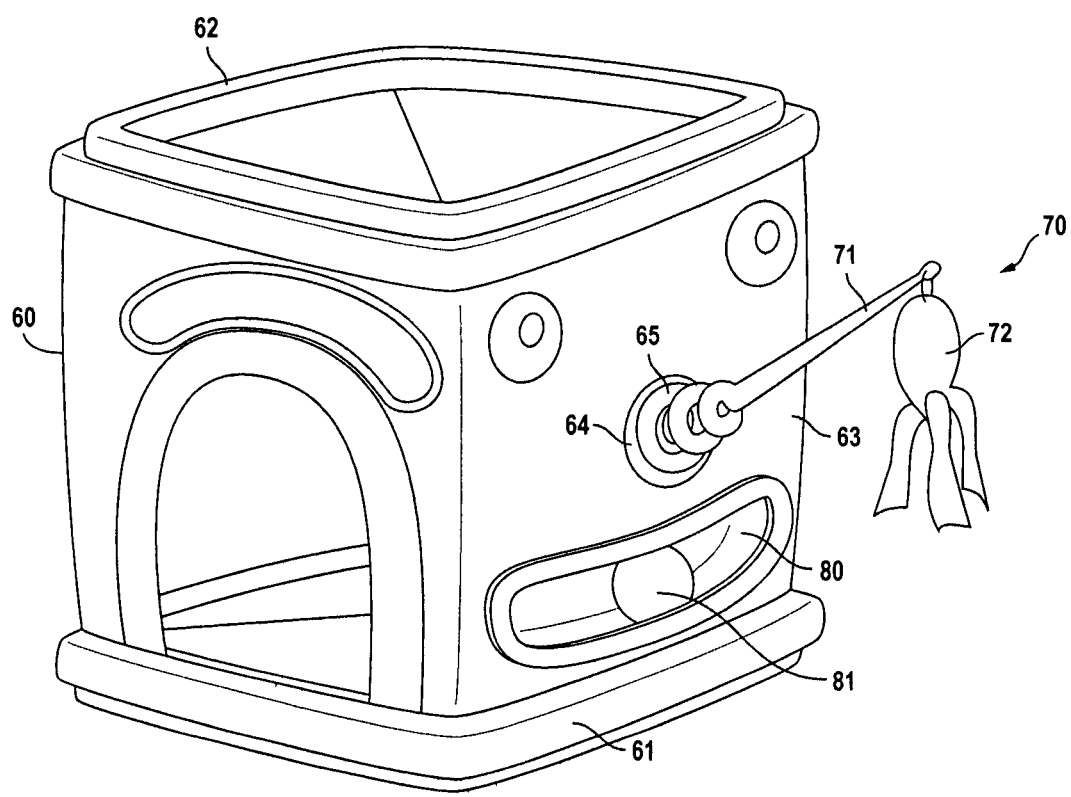
FIG. 4 shows another embodiment of the present invention again illustrating the use of other pet attractants.

Along a similar vein, a further iteration of the present invention is illustrated in FIG. 4 whereby pet furniture 60 is shown having a substantially square or rectangular foot print defined by lower cap 61 and upper cap 62. It will thus be appreciated that the geometry of the present pet furniture is a matter of design choice and can be made in virtually any geometric shape.

Turning again to FIG. 4, it is noted that structural side wall 63 can be provided with receiving slots 64 for the receipt of further pet attractant toys 70. In this instance, wand 71 supports feathered toy 72 which is, in turn, frictionally received by opening 65 within receiving opening 64. As such, not only can wand 71 be changed as to its location from position to position but as feathered toy 72 is degraded through constant use by a pet, it can be simply interchanged with a new toy which can be purchased by the consumer as an aftermarket addition to the present invention.

The attractant toys configured for use with the present pet furniture are almost limitless in their orientation and configuration. As a further example, reference is again made to FIG. 4 whereby slot 80 is shown configured within structural side wall 63 having an open area for receiving ball 81 sized to roll within slot 80 when swatted by, for example, a domestic cat.

As such, it should be quite apparent that not only is the pet furniture of the present invention highly adaptable to assume multiple configurations to stimulate and encourage use by a domestic pet, but can be shipped from an offshore manufacturing facility inexpensively while being simple enough to encourage rapid assembly by a typical consumer.

The invention claimed is:

1. A kit of parts for the construction of pet furniture comprising a lower cap sized to define the base of said pet furniture, a plurality of side clips for removable insertion within said lower cap, said side clips substantially defining the height of said pet furniture when said pet furniture is constructed from said kit of parts, a plurality of structural side walls for removable engagement with said lower cap and said side clips, at least one of said structural side walls having an opening sized to enable a pet to enter and exit said pet furniture once assembled, an upper cap for removably engaging said side clips and structural side walls, lower support discs sized to be supported by and removable from said lower cap and upper support discs sized to be supported and removable from said upper cap.

2. The kit of claim 1 wherein said lower support discs and upper support discs are interchangeable on said lower cap and said upper cap.

3. The kit of claim 1 wherein at least said lower support or upper support discs are faced with a plush surface.

4. The kit of claim 1 wherein at least said lower support or upper support discs are faced with a surface conducive to promote scratching by a cat.

5. The kit of claim 1 further comprising a second upper cap sized and configured to releaseably join said upper cap, a second set of side clips for removable insertion within said second upper cap, a second set of structural side walls for removable engagement with said second upper cap and said side clips and a third upper cap for removable engagement with said side clips and second set of structural side walls.

6. The kit of claim 5 wherein at least one of said second set of structural side walls is configured with an opening sized to enable a pet to enter and exit said pet furniture.

7. The kit of claim 5 comprising second upper support discs sized to be supported by and removable from said third upper cap.

8. The kit of claim 5 further comprising clips for releaseably connecting said second upper cap to said upper cap.

9. The kit of claim 1 further comprising an interface for the releaseable attachment of pet activity toys to said pet furniture.

10. The kit of claim 9 further comprising an adaptor clip for releaseably supporting said pet activity toys to said pet furniture at said interface.

11. The kit of claim 9 wherein said pet activity toy comprises a cat scratching surface.

12. The kit of claim 9 wherein said pet activity toy comprises a tethered cat attractant.

13. Pet furniture comprising a lower cap sized to define the base of said pet furniture, side clips removably insertable within said lower cap sized to substantially define the height of said pet furniture, structural side walls for removable engagement with said lower cap and side clips, at least one of said structural side walls having an opening sized to enable a pet to enter and exit said pet furniture, an upper cap for removably engaging said side clips and structural side walls, lower support discs sized to be supported by and removable from said lower cap and upper support discs sized to be supported by and removable from said upper cap.

14. The pet furniture of claim 13 wherein said lower support discs and upper support discs are interchangeable on said lower cap and said upper cap.

15. The pet furniture of claim 13 wherein at least said lower support or upper support discs is faced with a plush surface.

16. The pet furniture of claim 13 wherein at least said lower support or upper support discs are faced with a surface conducive to promoting scratching by a cat.

17. The pet furniture of claim 13 further comprising a second upper cap sized and configured to releaseably join said upper cap, a second set of side clips for removable insertion within said second upper cap, a second set of structural side walls for removable engagement with said second upper cap and said side clips and a third upper cap for removable engagement with said side clips and second set of structural side walls.

18. The pet furniture of claim 17 wherein at least one of said second set of structural side walls is configured with an opening sized to enable a pet to enter and exit said pet furniture.

19. The pet furniture of claim 17 comprising second upper support discs sized to be supported by and removable from said third upper cap.

20. The pet furniture of claim 17 further comprising clips for releaseably connecting said second upper cap to said upper cap.

21. The pet furniture of claim 13 further comprising an interface for releaseable attachment of a pet activity toy to said pet furniture.

22. The pet furniture of claim 21 wherein said pet activity toy comprises a cat scratching surface.

23. The pet furniture of claim 21 wherein said pet activity toy comprises a tethered cat attractant.

* * * * *